United States Patent [19]
Whitfield

[11] 3,835,568
[45] Sept. 17, 1974

[54] FISHING ROD AND REEL ASSEMBLY HOLDER

[76] Inventor: Willis C. Whitfield, 1201 W. Market St., Taylorville, Ill. 62568

[22] Filed: Aug. 29, 1973

[21] Appl. No.: 392,654

[52] U.S. Cl. .......................... 43/17, 43/21.2, 248/42
[51] Int. Cl. ............................................ A01k 97/12
[58] Field of Search .................. 43/17, 21.2; 248/42

[56] References Cited
UNITED STATES PATENTS

| | | | |
|---|---|---|---|
| 1,737,921 | 12/1929 | Derr | 43/17 |
| 2,311,823 | 2/1943 | Gaskill, Sr. | 43/21.2 |
| 2,430,112 | 11/1947 | Hamre | 248/42 |
| 2,689,275 | 1/1959 | Levin | 43/17 |
| 2,785,494 | 3/1957 | Eaton | 43/17 |
| 3,134,187 | 5/1964 | Blakely | 43/17 |

*Primary Examiner*—Louis G. Mancene
*Assistant Examiner*—Daniel J. Leach
*Attorney, Agent, or Firm*—John W. Melville; Albert E. Strasser; Stanley H. Foster

[57] ABSTRACT

A fishing rod and reel assembly holder having means for signalling a stroke. The holder includes an upright support and an alarm box carried by the top of the upright support. Clamping means are carried by the top of the alarm box and a pair of opposed forward and reward U-shaped members, the legs of both of which are adjustably held by the clamping means, provide a rod and reel assembly support. Lever actuated switch means is mounted within the box with the lever thereof positioned through the top of the box so that the fishing line may pass from the reel around the lever and then through the eylets on the rod and into the water. The slightest pull on the fishing line of a supported fishing rod and reel assembly by a striking fish triggers the lever, actuates the switch and initiates the alarm.

9 Claims, 4 Drawing Figures

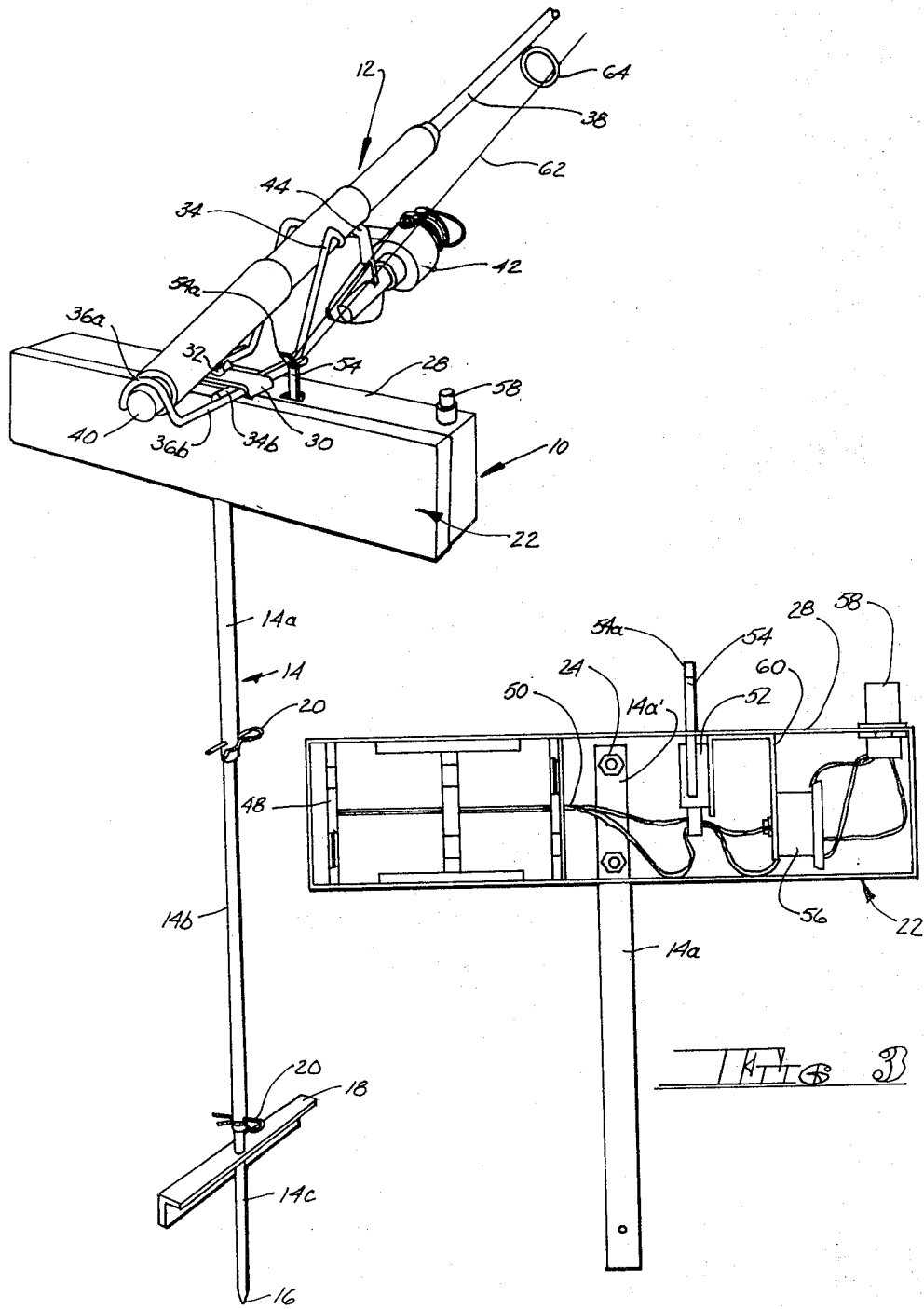

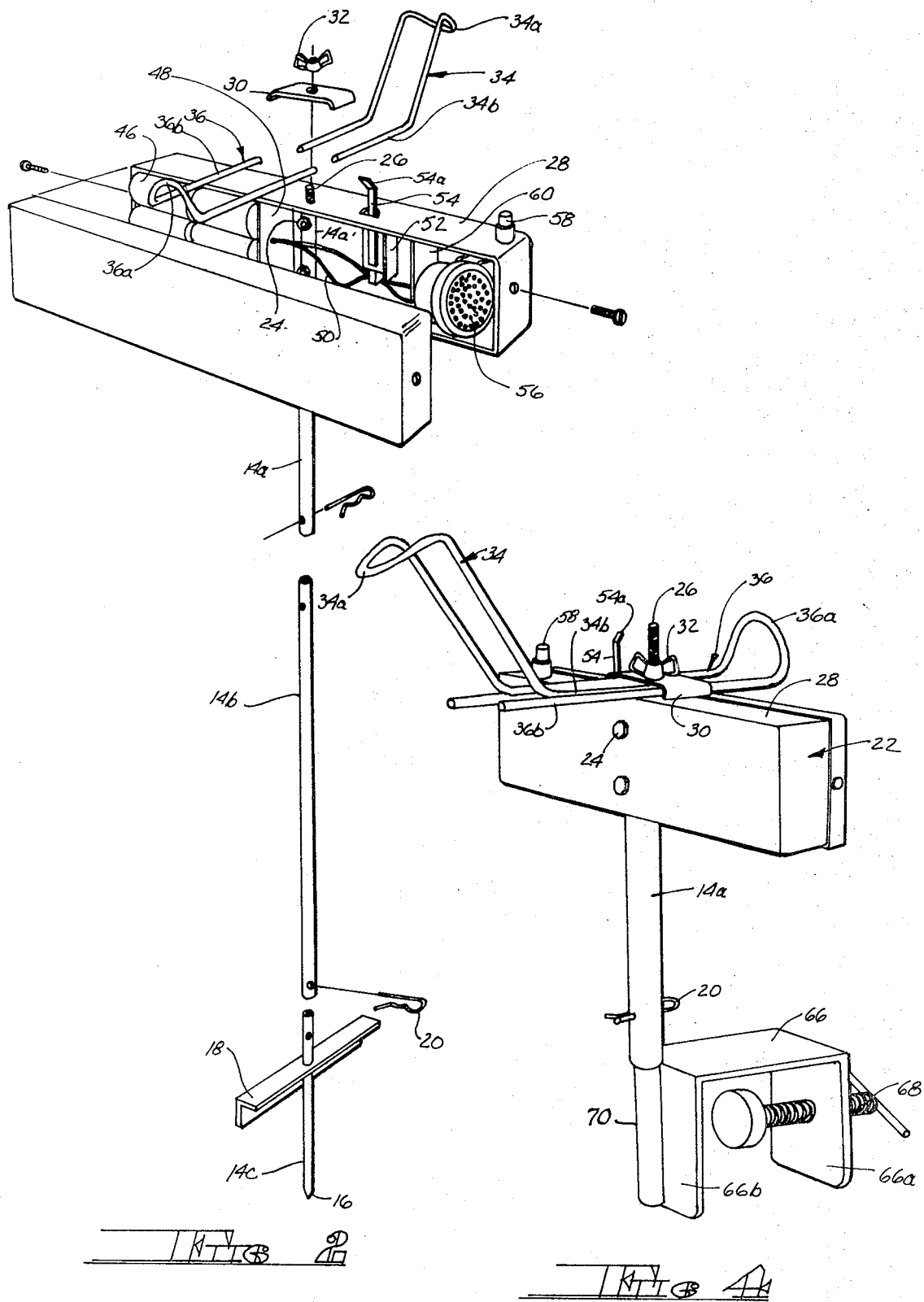

FISHING ROD AND REEL ASSEMBLY HOLDER

BACKGROUND OF THE INVENTION

1. Field of the Invention

The invention relates to a fishing rod and reel assembly holder, and more particularly to a fishing rod and reel assembly holder which will retain a fishing rod and reel assembly, and when a fish strikes, provide a visual and/or audible alarm to attract the attention of the fisherman.

2. Description of the Prior Art

As the leisure time of people has increased, fishing, as a sport, has become more popular. However, many fisherman do not like to constantly hold their fishing rod and reel assemblies, but instead, would rather secure such assemblies in place while they engage in other activities, checking the assembly only occasionally to see if a fish, attracted by the bait used, has taken the hook.

Various alarms have been devised in the past to signal a bite on fishing tackle. However, such prior art alarms have all had various shortcomings which prevent their being popular. Among these are such auxiliary apparatuses as rod-attached switches operated by the line or the reel but which when the time comes to fight the fish become a nuisance and hinderance. Additionally, such devices have also utilized switch buttons which are actuated by the rod itself, requiring a rather substantial strike by a fish before the alarm or signal is initiated to apprise the fisherman of the strike. A variety of such fishing rod and reel assembly holders have been devised. Representative holders of this kind, for example, are disclosed in U.S. Pat. Nos. 3,646,697; 3,645,028; 3,628,275; 3,618,068; 3,134,187; and 2,948,076.

SUMMARY OF THE INVENTION

The present invention provides a fishing rod and reel assembly holder. This holder includes an upright support having an alarm box carried by the top thereof. Clamping means are carried by the top of the alarm box and adjustably hold the legs of a pair of opposed forward and rearward U-shaped members.

The forward U-shaped member is so configured that its base passes under and supports the rod adjacent and in abutment with the foot of the reel so as to prevent rearward shifting of the rod. The rearward U-shaped member is so configured that its base passes over and supports the butt end of the rod so as to prevent upward pivotal movement of the butt end about the base of the forward U-shaped member. The opposed forward and rearward U-shaped members are so positioned that the weight of the rod and reel assembly will tend to pivot the rod and reel assembly about the base of the forward U-shaped member, maintaining the butt end of the rod in contact with the base of the rearward U-shaped member.

Lever actuated switch means is mounted within the alarm box with the lever thereof normally positioned through the top of the box so that fishing line may pass from the reel around the lever and then through the eyelets on the rod assembly and then into the water. An operable connection is provided between the switch means and the alarm. The slightest pull on the fishing line of a supported fishing rod and reel assembly by a striking fish will trigger the sensitive lever, actuating the switch means and initiating the alarm.

In a preferred embodiment, the legs of the U-shaped members are adjustably held by the clamp means such that the bases thereof may be shifted toward and away from each other, as desired, to accommodate rod and reel assemblies of different size and configurations.

The alarm box may contain a visual alarm and an audible alarm and the switch means may energize both the visual and audible alarms. Further, batteries may be contained in the alarm box for energizing the alarm.

In a preferred embodiment the upright support comprises a plurality of telescoping rod members the joined ends of which are secured together by clips. The bottom most rod member may be provided with a foot step, whereby the upright support may be easily inserted in the ground. In lieu of the foot step, the upright support may be provided with a boat holder C-clamp.

The fishing rod and reel assembly holder of the present invention has many applications for the angler. For example, it may be used from a fishing bank for dead line or float fishing. The rod and reel assembly holder of the present invention is also excellent for night fishing or ice fishing. Furthermore, it can be used from a boat for dead line fishing, float fishing or drift fishing. Finally, the holder of the present invention may also be used on a boat for trolling, which leaves a fisherman's hands free to operate his boat until he has a strike.

The fishing rod and reel assembly holder of the present invention eliminates many problems which have heretofor been experienced by fishermen, including the shortcomings of prior art alarms. For example, the fishing rod and reel assembly holder of the present invention is such that the slightest pull on the fishing line by a fish triggers the lever and switch means which activates the buzzer and light, signalling the fisherman that a fish is biting at the bait.

If a fisherman likes to cast artificial lures as well as fish with live bait or prepared bait on another rod and reel at the same time, the holder of the present invention allows his hands to be free to do so. Additionally, when night fishing, the holder of the present invention eliminates the problem of trying to watch the fishing line or float with a fishing light, which draws many bugs.

BRIEF DESCRIPTION OF THE DRAWINGS

FIG. 1 is a perspective view of the fishing rod and reel assembly holder of the present invention supporting a rod and reel assembly.

FIG. 2 is an exploded, perspective view of the fishing rod and reel assembly holder of the present invention.

FIG. 3 is an enlarged side elevational view of the alarm box with the cover removed.

FIG. 4 is a perspective view showing the fishing rod and reel assembly holder of the present invention provided with a boat holder C-clamp.

DESCRIPTION OF THE PREFERRED EMBODIMENT

Referring to FIG. 1, the fishing rod and reel assembly holder 10 of the present invention is supporting a fishing rod and reel assembly 12 as illustrated. The holder 10 includes an upright support 14 having a pointed end 16 adapted for insertion into the ground, and a foot step 18 by means of which pressure may be exerted to force the pointed end 16 into the ground. The upright support 14 preferably comprises a plurality of telescoping rod members 14a, 14b and 14c, the joined ends of which are secured together by clips 20.

An alarm box 22 is secured to the top 14a' of the uppermost rod member 14a of the upright support 14 by any suitable fastening means, such as the bolts 24. A stud or bolt 26 extends through an opening in the top 28 of the alarm box 22 and carries a clamping member 30 and a wing nut 32. The legs 34b and 36b of the pair of opposed forward and rearward U-shaped members 34 and 36, respectively, are adjustably held to the top 28 of the alarm box 22 by the clamping member 30.

As can be seen, the forward U-shaped member 34 is so configured that its base 34a passes under and supports the rod 38 adjacent and in abutment with the foot 44 of the reel 42 so as to prevent rearward shifting of the rod 38. The rearward U-shaped member 36 is so configured that its base 36a passes over and supports the butt end 40 of the rod 38 so as to prevent upward pivotal movement of the butt end 40 about the base 34a of the forward U-shaped member 34. The forward and rearward U-shaped members 34 and 36 are so positioned with respect to the rod 38 that the weight of the rod and reel assembly 12 tends to pivot the rod and reel assembly 12 about the base 34a of the forward U-shaped member 34, maintaining the butt end 40 of the rod 38 in contact with the base 36a of the rearward U-shaped member 36.

The alarm box 22 contains two pairs of batteries 46 mounted in the holder 48. Wires 50 extend through a lever actuated manual switch 52, the lever 54 of which is shiftable between an on position and an off position, and then to an audible alarm 56 and to a visual alarm 58. The switch 52 and the audible alarm 56 are preferably mounted within the alarm box 22 by the holder 60, and the visual alarm 58 comprises a bulb located exteriorly of the alarm box 22. The lever 54 of the switch 52 is normally positioned through the top 28 of the alarm box 22 so that fishing line 62 may pass from the reel 42 around the lever 54 and then through the eyelets 64 on the rod 38 and then into the water. In practice it has been found preferable if the top 54a is slightly bent backward to prevent the fishing line 62 from slipping off.

When the switch 52 is in the on position, it engages the wires 50 leading to the audible and visual alarms 56 and 58, respectively, so that the slightest pull on the fishing line 62 of a supported fishing rod and reel assembly 12 by a striking fish will trigger the sensitive lever 54, closing the switch 52 and actuating the audible and visual alarms 56 and 58, respectively.

It will, of course, be understood that the switch 52 and the audible and visual alarms 56 and 58 may also be wired such that the audible alarm 56 or the visual alarm 58 may be actuated separately, or together, as desired. The lever 54 of the switch 52 may also be moved to an off position when no alarm is desired.

As previously indicated, the upright support 14 preferably comprises a plurality of telescoping rod members. The number of rod members utilized will, of course, depend upon the height at which it is desired to locate the fishing rod and reel assembly 12. For example, the intermediate rod member 14b may be eliminated so that the upright support 14 comprises only the rod members 14a and 14c. Further, it may be desirable to eliminate the rod members 14b and 14c and to utilize a boat holder with the rod member 14a. A suitable boat holder 66 is disclosed in FIG. 4. As can be seen, the boat holder 66 comprises a C-clamp which will fit over the edge of a boat. One leg 66a of the clamp 66 is provided with a clamping member 68 to tighten the clamp to the boat. The other leg 66b is provided with a rod member 70 having an upper end which may be telescopically received by the rod member 14a and suitably attached thereto by a clip 20.

In operation, after casting the fishing line 62 into the water, the rod and reel assembly 12 is placed on the forward and rearward U-shaped members 34 and 36, respectively, with the base 34a of the forward U-shaped member 34 passing under and supporting the rod 38 and the base 36a of the rearward U-shaped member 36 passing over and supporting the butt end 40 of the rod 38. The fishing line 62 just in front of the reel 42 is pinched and placed over the top 54a of the lever 54 on the switch 52.

As previously indicated, the switch 52 is extremely sensitive and will warn the fisherman if a fish is nibbling at his bait by the audible and visual alarms 56 and 58, respectively, going on and off. If a fish takes the bait in its mouth and starts to move away, the audible and visual alarms 56 and 58 will stay on. At this point the fisherman simply has to lift the rod and reel assembly 12 from the forward and rearward U-shaped members 34 and 36, respectively, and pull back the rod 38 to set the hook.

Accordingly, it will be easily seen that the fishing rod and reel assembly holder 10 of the present invention allows a fisherman to throw out a baited line and set his rod and reel assembly down and relax, confident that if a fish strikes his bait, the holder will signal that a fish is biting. The fishing line may be removed from the lever on the switch with ease by simply raising the rod and reel assembly, in one upward motion out of the holder and pulling backward. If a fish is still biting, this action will in most cases set the hook as well.

While certain preferred embodiments of the invention have been specifically illustrated and described, it is understood that the invention is not limited thereto, as many variations will be apparent to those skilled in the art, and the invention is to be given its broadest interpretation in the terms of the following claims.

The embodiments of the invention in which an exclusive property or privilege is claimed are defined as follows:

1. A fishing rod and reel assembly holder comprising, in combination, an upright support; an alarm box carried by the top of said upright support; clamping means carried by the top of said alarm box; a pair of opposed forward and rearward U-shaped members the legs of both of which are adjustably held by said clamping means, said forward member being so configured that its base passes under and supports said rod adjacent and in abutment with the foot of said reel so as to prevent rearward shifting of said rod, and said rearward member being so configured that its base passes over and supports the butt end of said rod so as to prevent upward pivotal movement of said butt end about said base of said forward member, said U-shaped members being so positioned with respect to said rod that the weight of said rod and reel assembly will tend to pivot said rod and said reel assembly about said base of said forward U-shaped member, maintaining said butt end of said rod in contact with said base of said rearward U-shaped member; an electric alarm in said box; lever actuated switch means mounted within said box with the lever thereof normally positioned through the top of said box so that fishing line may pass from said reel around said lever and then through the eyelets on said rod and then into the water; and an operable connection between said switch means and said alarm; whereby the slightest pull on the fishing line of a supported fishing rod and reel assembly by a striking fish will trigger said lever, actuating said switch means to initiate said alarm.

2. The fishing rod and reel assembly holder according to claim 1, wherein said legs of said members are adjustably held by said clamp means such that said bases of said U-shaped members may be shifted toward and away from each other, as desired, whereby to accommodate rod and reel assemblies of different sizes and configurations.

3. The fishing rod and reel assembly holder according to claim 1, wherein said alarm box contains a visual alarm and an audible alarm and said switch means energizes both said visual and audible alarms.

4. The fishing rod and reel assembly holder according to claim 1, wherein batteries are contained in said alarm box for energizing said alarm.

5. The fishing rod and reel assembly holder according to claim 1, wherein said upright support comprises a plurality of telescoping rod members the joined ends of which are secured together by clips.

6. The fishing rod and reel assembly holder according to claim 1, wherein said upright support is provided at its other end with a foot step, whereby said upright support may be easily inserted in the ground.

7. The fishing rod and reel assembly holder according to claim 6, wherein said foot step is substantially perpendicular to said upright support member.

8. The fishing rod and reel assembly holder according to claim 1, wherein the other end of said upright support is provided with a boat holder U-clamp.

9. The fishing rod and reel assembly holder according to claim 1, wherein the top of said lever is slightly bent backward to prevent the fishing line from slipping off.

* * * * *